US012057641B2

(12) United States Patent
Neenan et al.

(10) Patent No.: US 12,057,641 B2
(45) **Date of Patent: *Aug. 6, 2024**

(54) EMERGENCY PORTABLE HOT SPOT WITH ANTENNAS BUILT INTO COVER

(71) Applicant: Parsec Technologies, Inc., Plano, TX (US)

(72) Inventors: Michael A. Neenan, Plano, TX (US); Richard Smith, Dallas, TX (US)

(73) Assignee: Parsec Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,614

(22) Filed: Apr. 17, 2023

(65) Prior Publication Data

US 2023/0402732 A1 Dec. 14, 2023

Related U.S. Application Data

(63) Continuation of application No. 17/739,431, filed on May 9, 2022, now Pat. No. 11,664,574, which is a (Continued)

(51) Int. Cl.

*H01Q 21/28* (2006.01)
*H01Q 1/02* (2006.01)
(Continued)

(52) U.S. Cl.

CPC ............... *H01Q 21/28* (2013.01); *H01Q 1/02* (2013.01); *H01Q 1/04* (2013.01); *H01Q 1/241* (2013.01); *H01Q 1/42* (2013.01); *H01Q 9/0421* (2013.01)

(58) Field of Classification Search

CPC .. H01Q 1/02; H01Q 1/04; H01Q 1/08; H01Q 1/241; H01Q 1/243; H01Q 1/42;
(Continued)

(56) References Cited

U.S. PATENT DOCUMENTS

| | | |
|---|---|---|
| 5,966,102 A | 10/1999 | Runyon |
| 6,111,550 A | 8/2000 | Miller et al. |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Robert Karacsony
(74) *Attorney, Agent, or Firm* — Knobbe, Martens, Olson & Bear, LLP

(57) ABSTRACT

An antenna unit includes a case having a base and a lid. An antenna assembly is located within the lid and is IP67 compliant, being waterproof. The antenna assembly can provide antennas located on one or more baseplates that are positioned within the top cover of the box. A baseplate can act as a heatsink, a reflector, and/or a ground plane, for the antennas while the cover is closed and in the locked position. The antennas have been designed and optimized to work on a baseplate and designed to operate with the thick plastic cover of the box. A plurality of antenna components are situated within the base separate from the antenna assembly. An optional barrier is located within the base to divide the antenna components from the lid. The antenna assembly include different types of antennas operable at least between 600 MHz to 39 GHz. The lid is separable from the base and is divided from other components to minimize interference so that all antennas may operate simultaneously while the lid is in a closed position.

14 Claims, 19 Drawing Sheets

Related U.S. Application Data continuation of application No. 17/092,983, filed on Nov. 9, 2020, now Pat. No. 11,329,363.

(51) Int. Cl.

| | |
|---|---|
| ***H01Q 1/04*** | (2006.01) |
| ***H01Q 1/24*** | (2006.01) |
| ***H01Q 1/42*** | (2006.01) |
| ***H01Q 9/04*** | (2006.01) |

(58) Field of Classification Search

CPC ............ H01Q 1/428; H01Q 3/02; H01Q 3/04; H01Q 3/06; H01Q 9/0421; H01Q 21/28; H05K 5/0021; H05K 5/0213; H05K 5/0214; H05K 5/0217; H05K 5/0226; H05K 5/0247; H05K 5/03; H04W 88/08; H04W 88/085; H04W 88/10

See application file for complete search history.

(56) References Cited

U.S. PATENT DOCUMENTS

| | | | | |
|---|---|---|---|---|
| 11,283,149 | B2 | 3/2022 | Neenan et al. | |
| 11,329,363 | B1 * | 5/2022 | Neenan .................... | H01Q 1/02 |
| 11,664,574 | B2 * | 5/2023 | Neenan .................... | H01Q 1/04 343/719 |
| 11,909,090 | B2 | 2/2024 | Neenan et al. | |
| 11,936,094 | B2 | 3/2024 | Neenan et al. | |
| 2010/0253584 | A1 | 10/2010 | Yang et al. | |
| 2011/0102278 | A1 | 5/2011 | Rozan | |
| 2012/0146872 | A1 | 6/2012 | Chainon et al. | |
| 2014/0139387 | A1 | 5/2014 | Jones et al. | |
| 2014/0375507 | A1 | 12/2014 | Lin et al. | |
| 2015/0042521 | A1 | 2/2015 | Hazen | |
| 2015/0102974 | A1 | 4/2015 | Stoytchev et al. | |
| 2016/0277062 | A1 | 9/2016 | Cheon et al. | |
| 2017/0324171 | A1 | 11/2017 | Shehan | |
| 2018/0062731 | A1 | 3/2018 | Ng et al. | |
| 2019/0237850 | A1 | 8/2019 | Fleischer et al. | |
| 2019/0305406 | A1 | 10/2019 | Williams | |
| 2019/0341674 | A1 | 11/2019 | Rosenthal et al. | |
| 2020/0411972 | A1 | 12/2020 | Hicks et al. | |
| 2021/0391655 | A1 | 12/2021 | Brobston et al. | |
| 2023/0055367 | A1 | 2/2023 | Neenan et al. | |
| 2023/0402733 | A1 | 12/2023 | Neenan et al. | |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| EP | 0 349 499 | 1/1990 |
| WO | WO 2024/035801 | 2/2024 |
| WO | WO 2024/035805 | 2/2024 |
| WO | WO 2024/035810 | 2/2024 |

* cited by examiner

EMERGENCY PORTABLE HOT SPOT WITH ANTENNAS BUILT INTO COVER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present application relates to the field of wireless broadband data communication, and more particularly to antenna systems.

Description of Related Art

It has been desired to protect antennas to elements of the weather for some time. It is a desire that the antennas satisfy an IP67 rating which means the unit can be dropped into a body of water up to a meter deep for 30 min. The existing technology includes three different approaches to satisfy this rating.

The first and most common approach is to place a standard commercially available antenna inside the bottom of the case, attached to a router or radio module via coax cables. This limits performance since the antenna gets dielectrically loaded with the additional layer of the plastic while inside the case. The typical radome of a commercial grade antenna is 1.5 mm thick. All commercial antennas are designed with their existing radome in place, not an additional cover which is used in these boxes. The additional layer of plastic is typically 3.5 mm thick, which dielectrically loads the antenna and reduces the performance by making the center frequency shift on the antennas inside the original package. This dielectric load comes from all angles in the top, bottom and sides of the box. Typically, these boxes are loaded with extra cables, batteries and accessories that further interrupt the RF path to the antennas, thus reducing the performance of the antenna as well.

The second most common approach is to use screw on antennas directly on the router or radio module while the cover is open or to add the screw on antennas to the side of the case with a wall mount SMA jack that includes cables from the router or radio module to the side jack where the antenna are screwed on outside of the wall of the box or on the side. This approach enables the antenna to get a clean RF path to the antenna except on the side facing the box. Anything made out of metal in the RF path, plus the wall of the box will reduce the signal strength. The common industry complaint is that most of these antennas get broken or lost after repeated use and storage of the box.

The third approach is to have these standard commercial antennas arranged in the cover of a plastic Pelican or waterproof style box while in operation. These commercial antennas arranged in the top cover stacked in a vertical position inside the cover. The problem with this approach is the box needs to remain open to work, which defeats the purpose of using an IP67, waterproof rated portable box. The area behind the cover is now dielectrically loaded, thus reducing the performance of the antenna on that side.

BRIEF SUMMARY OF THE INVENTION

It is an object of the present application to improve the performance of antenna elements within a closed cover while maintaining GPS, LTE, Wi-Fi and both versions of 5G. The antenna assembly is configured to minimize interference by locating the antenna against a base plate acting partly as a heat sink. The antenna are able to function while the cover remains closed and maintain a IP67 rating.

It is an object of the present application to provide an antenna located on a baseplate that screws into the top cover of the box. This baseplate acts as a heatsink as well as a reflector for the antennas while the cover is closed and in the locked position. The antennas have been designed and optimized to work on the new baseplate and designed to operate with the thick plastic cover of the box. The added benefit is that the antennas are out of harms way and can operate without any other objects in the RF path. All other accessories, routers and batteries are stored below, out of the RF path of the antennas. The cover can now be closed and or locked for a proper IP67, waterproof operating environment.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
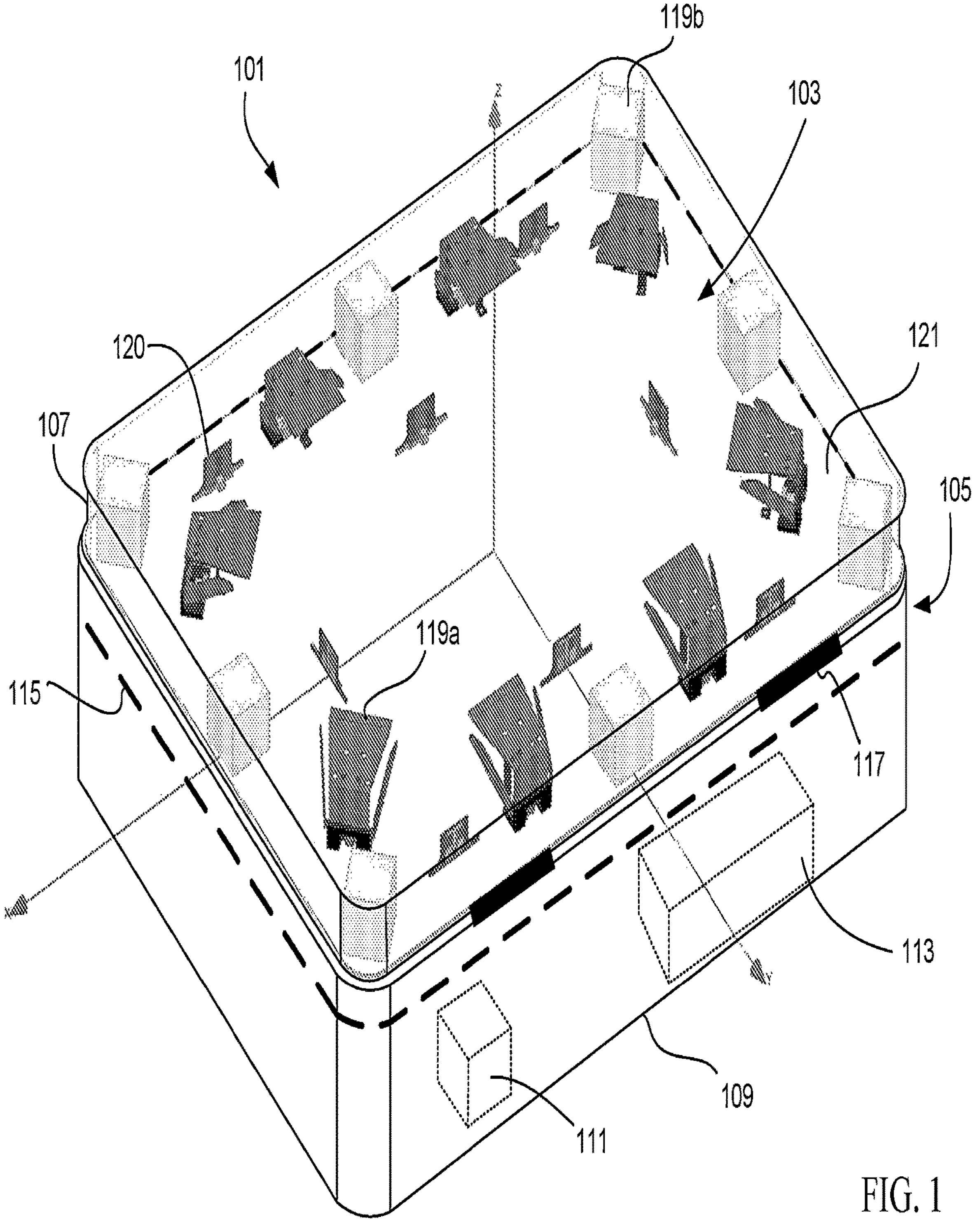
FIG. 1 is a perspective view of an antenna unit according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of a preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present invention overcomes one or more of the above-discussed problems commonly associated with traditional antenna systems. In particular, the system of the present invention is an antenna system having one or more types of antenna selectively located on a baseplate within an enclosure/case having an operational cover that is selectively opened and closed. The case allows for mobility and maintains high performance. The antennas are rugged and built into the cover. The case is protective, portable, tamperproof, and IP67 rated. These case antennas are ideal for mobile network in a box deployment, emergency communications, wireless internet backup and failover applications. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Referring now to the drawings wherein like reference characters identify corresponding or similar elements in form and function throughout the several views. FIG. 1 is a perspective view of antenna unit 101 including antenna assembly 103 and antenna case 105. Unit 101 is configured to locate assembly 103 within the cover or lid 107 of case 105 optionally separate from other components within the antenna unit 101, such as a router or power supply. Unit 101 is configured to minimize interference to enable increased performance of one or more antennas therein, all while the lid 107 of case 105 remains closed.

Case 105 includes a lid 107 and a base 109. As seen in FIG. 1, a perspective view of case 105 is shown. The one or more antennas are shown within the lid 107. Lid 107 is partially removed so as to permit visual inspection therein. Base 109 is selectively larger in volume than lid 107 and is configured to contain an internal volume for the storage of one or more antenna components, such as router 111 or power supply 113 for example. Case 105 is purposefully designed to separate the location of the antennas from the other antenna components in a manner to remove interference. An optional barrier 115 is laid within the interior of base 109 to act as a divider and separator from the lid 107.

It is understood that case 105 is configured to be IP67 compliant/rated, meaning it is waterproof. Case 105 may be made from any known materials and is typically hardened and durable to act as a protection to assembly 103 and other components therein. Cover/lid 107 is configured to pivot in an operable manner to act between an open and closed position. Hinges 117 are one suitable manner in which this may occur. It is understood that all that is necessary is that lid 107 is at least partially separable from base 109 to allow selective access internally.

Antenna assembly 103 is shown as having one or more antennas. The antennas may be of different shapes, operational ranges or frequencies, and sizes. As seen in FIG. 1, antenna **119*a* may be a dual band monopole antenna that has a configuration that, when used in conjunction with high order electromagnetic modes generated or received by a transceiver and/or receiver (as is typically performed for PIFA antennae), permit the antenna to have an operating frequency range of 600 MHz to 6.0 GHz. Furthermore, antenna 119*b* may be an antenna that has an operating range from 28-36 GHz. The use of one or more antennas allows for broad ranges of frequencies. A PCB 120** (printed circuit board) may also be included therein.

Unit 101 is configured ideally to act as an emergency portable hot spot and serve as a complete portable network in a singular box/case. It is used for emergency situations where a portable network is required. The main function is to route local Wi-Fi 5 or 6 (LAN) signals to WAN signals, which is typically 4G/5G LTE based. In the present application, unit 101 is configured for CAT 4 to CAT 18 LTE and may also include 5G NR(New Radio) which goes from 600 MHz to 6.0 Ghz for wide area cellular networks backhaul and 5G millimeter wave which uses 24, 28 and 39 GHz bands. Unit 101 is also for Local cellular short haul (150 ft ultra high speed to LTE). Unit 101 imbeds GPS, LTE and Wi-Fi antennas in the lid 107 of the case 105. Unit 101 also includes GPS, LTE, Wi-Fi and both version of 5G all in one case 105, working at the same time for maximum throughput, upload and download speeds for portable internet access.

The antennas 119*a*/119*b* are secured to a baseplate 121 that screws into the top cover 107 of the case 105. This baseplate 121 acts as a heatsink as well as a reflector for the antennas 119*a*/119*b* while the cover 107 is closed and in the locked position. The antennas 119*a*/119*b* have been designed and optimized to work on the new baseplate 121 and are designed to operate within lid 107 so as to transmit and receive data. An added benefit is that the antennas 119*a*/119*b* are out of harms way and can operate without any other objects in the RF path. All other accessories, routers and batteries are stored below, under barrier 115, out of the RF path of the antennas. The cover can now be closed and or locked for a proper IP67, waterproof operating environment.

Figure 2:
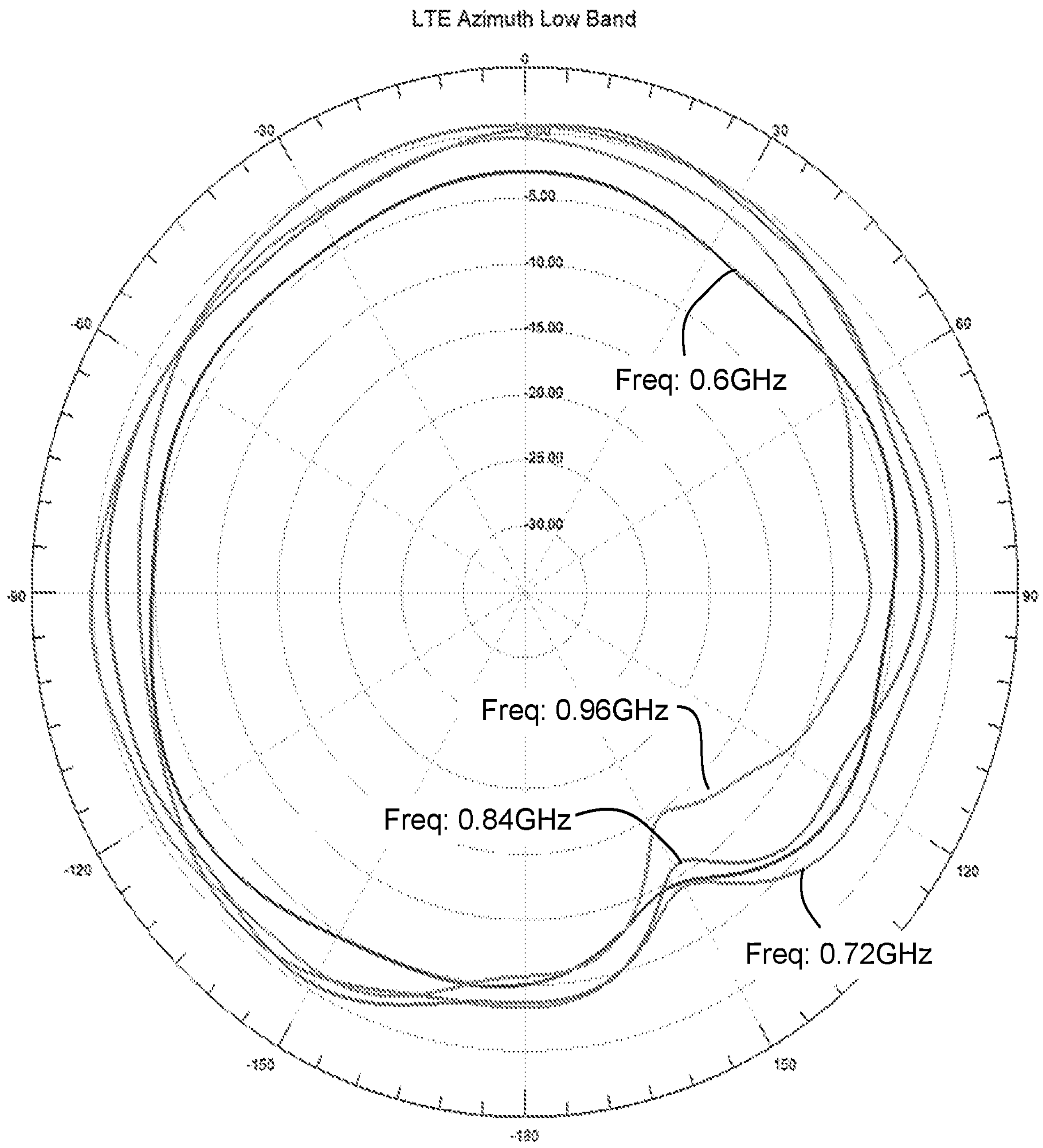
FIGS. 2-19 are graphs of the antenna unit of FIG. 1 operating in different bands of frequencies.
Figure 3:
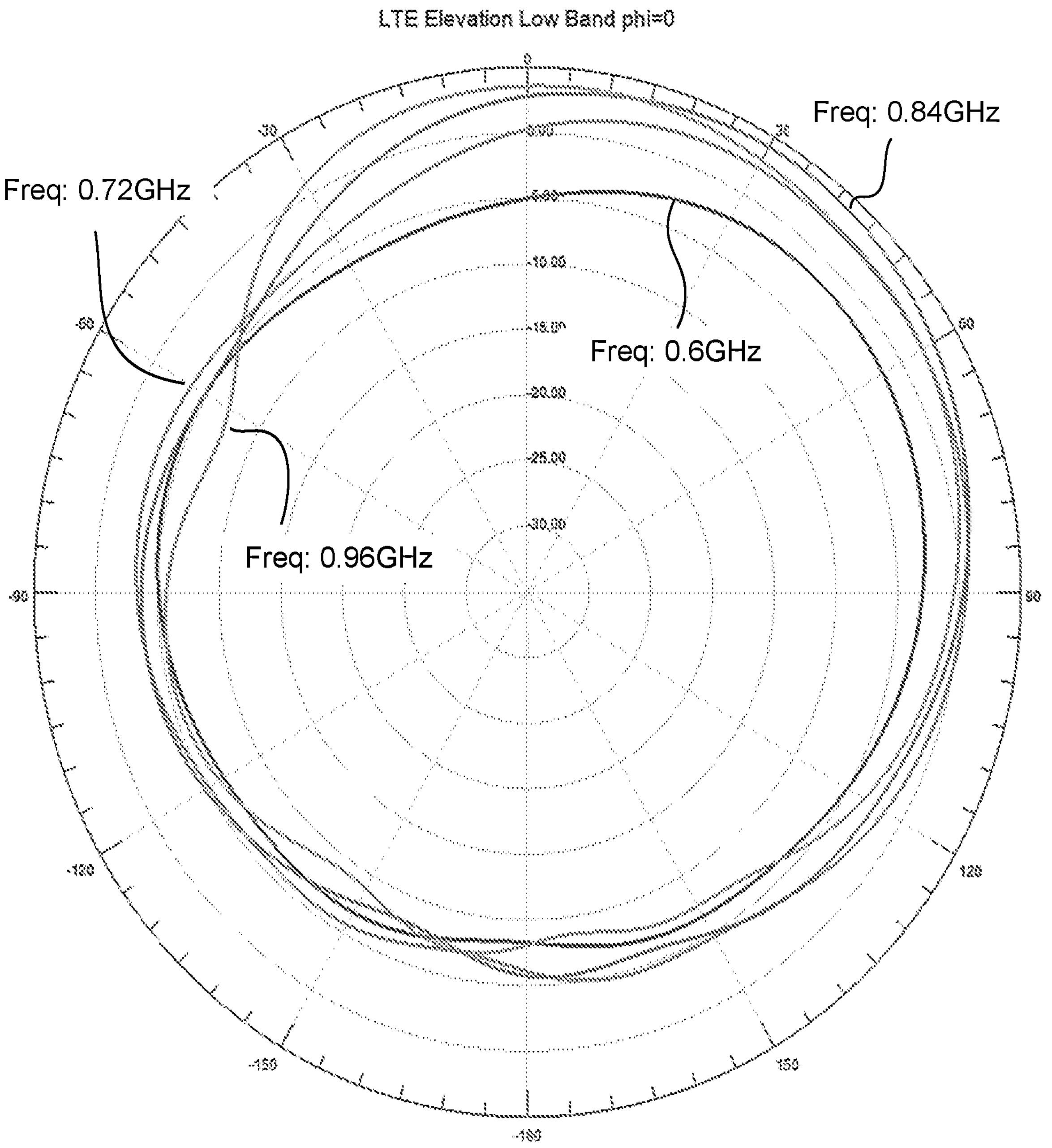
Figure 4:
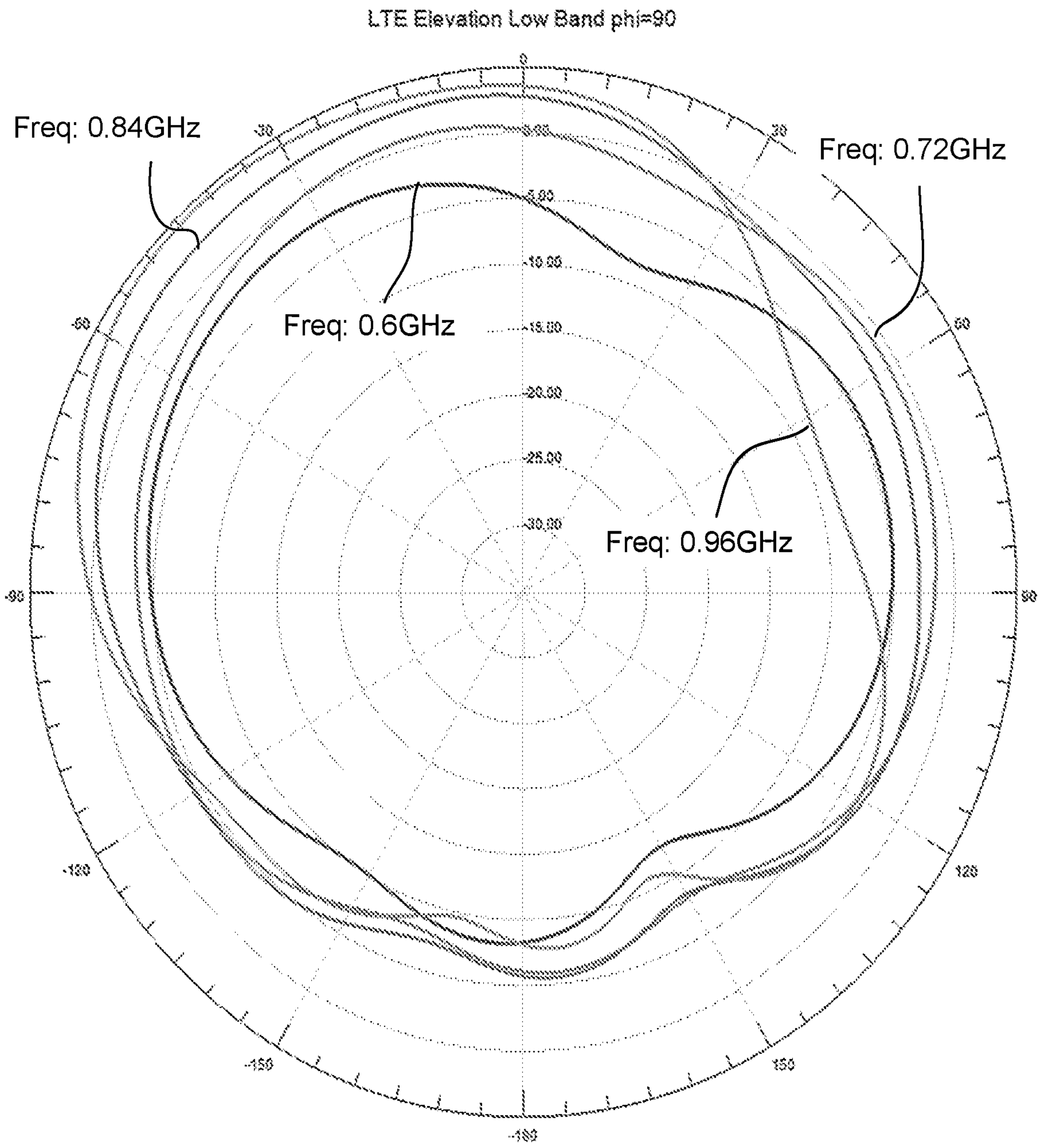
Figure 5:
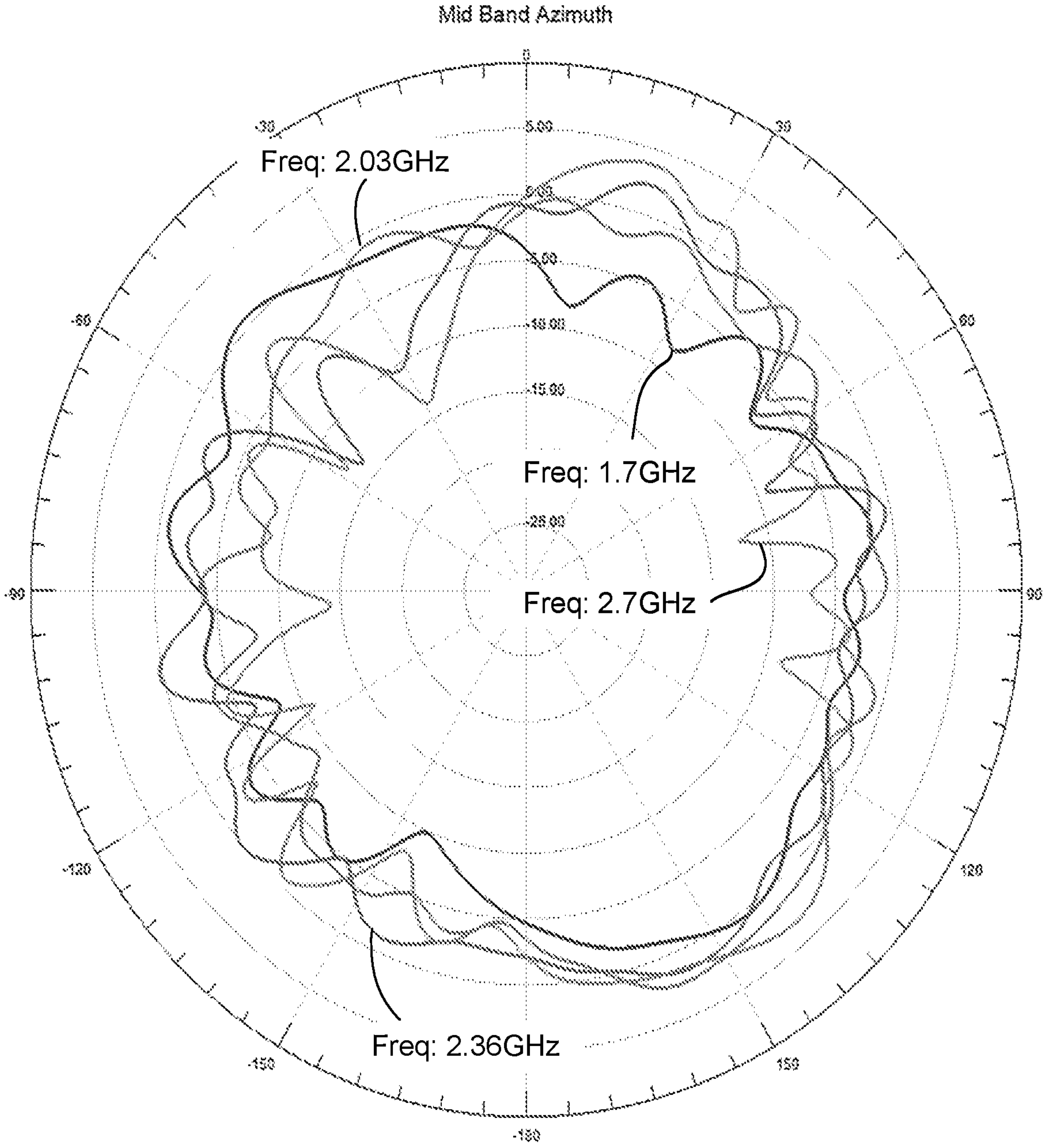
Figure 6:
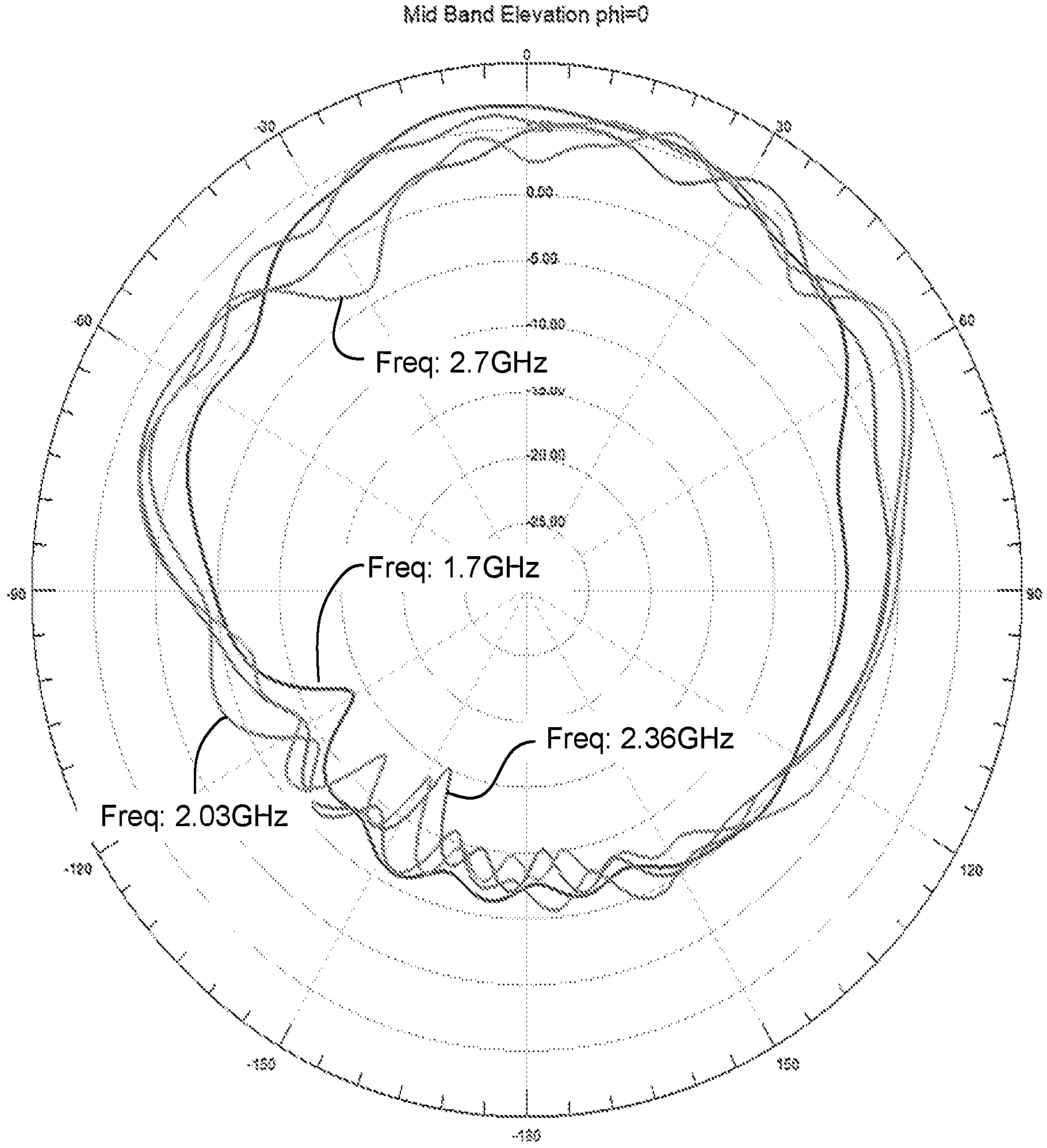
Figure 7:
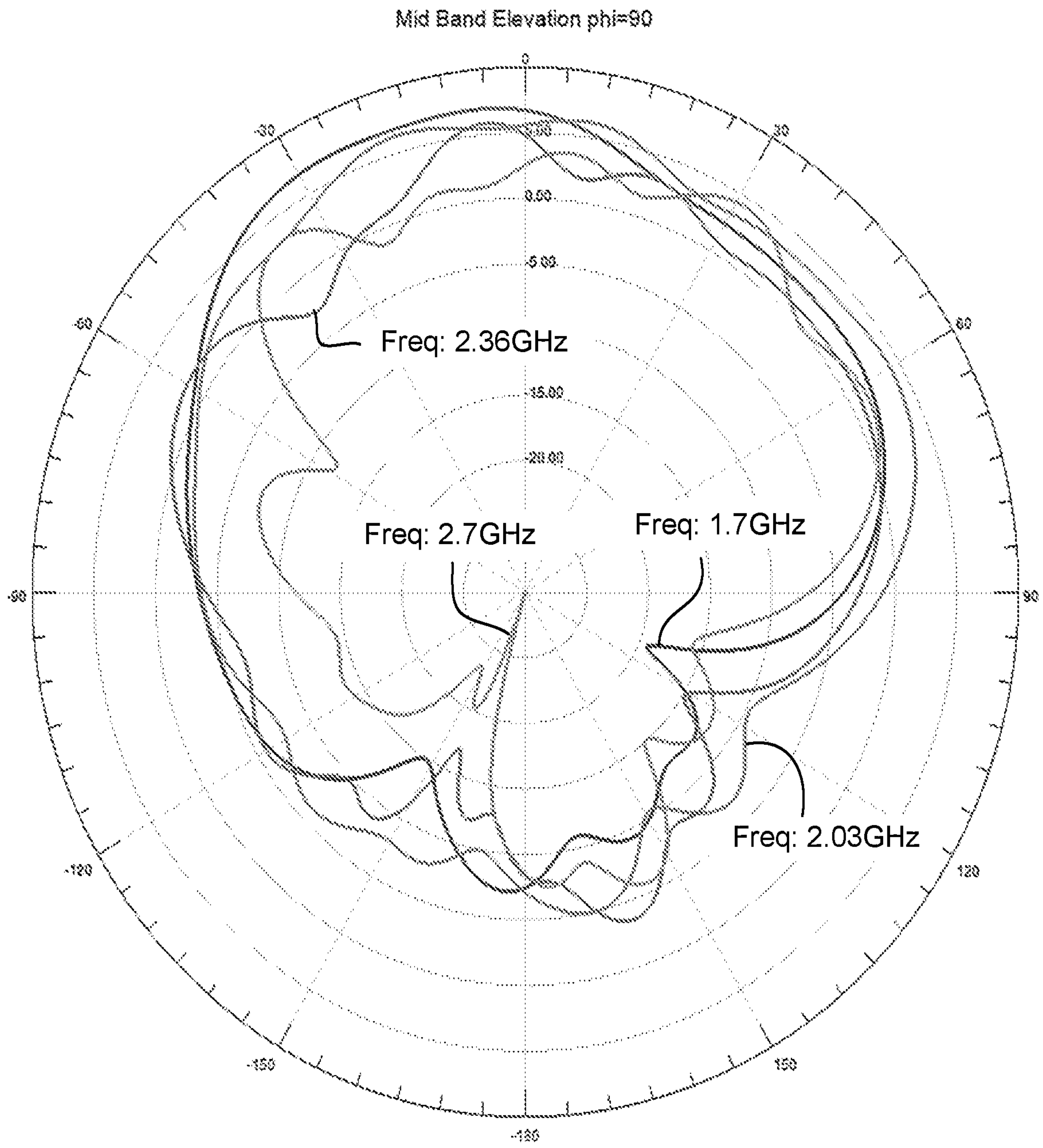
Figure 8:
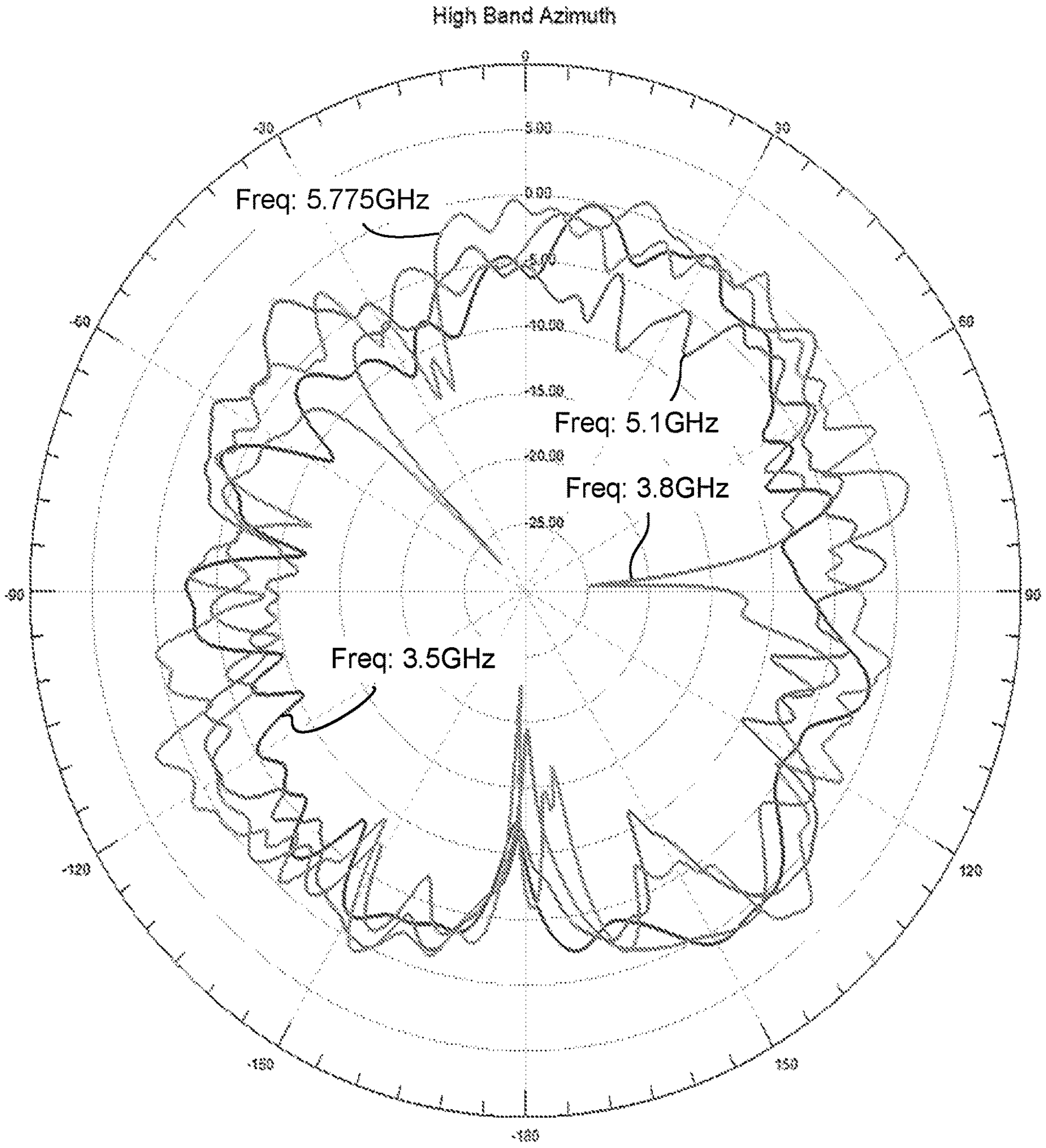
Figure 9:
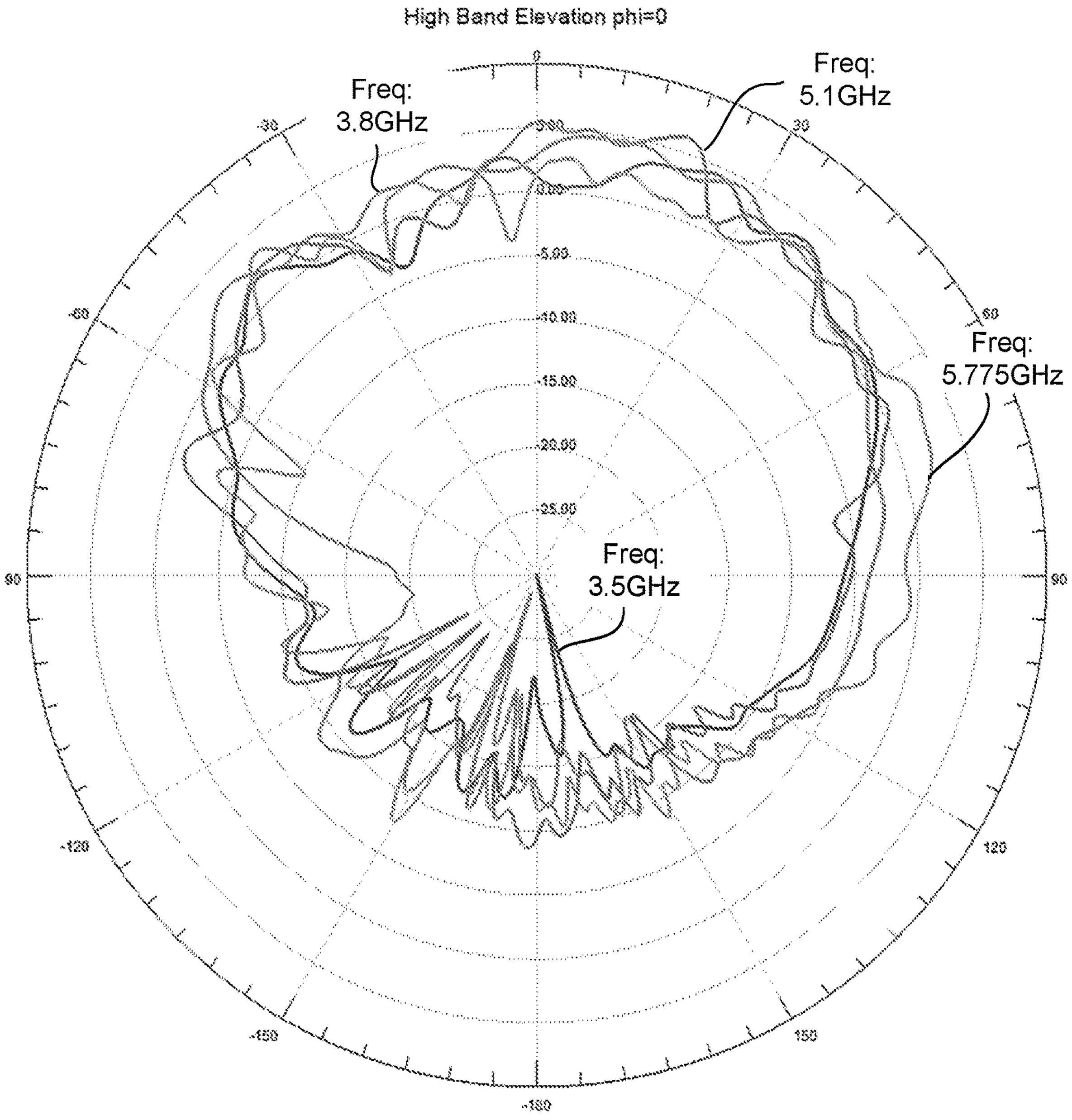
Figure 10:
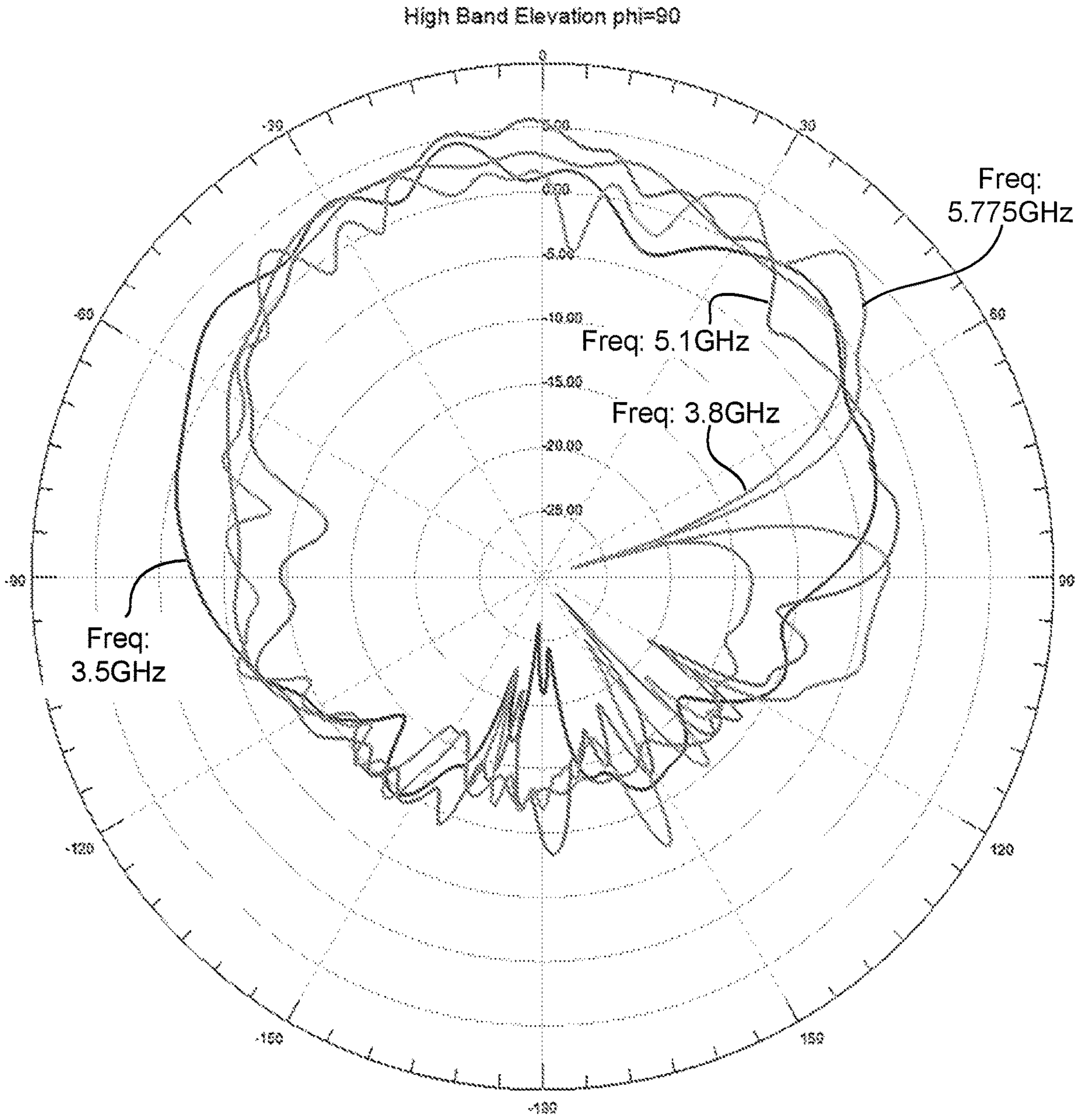
Figure 11:
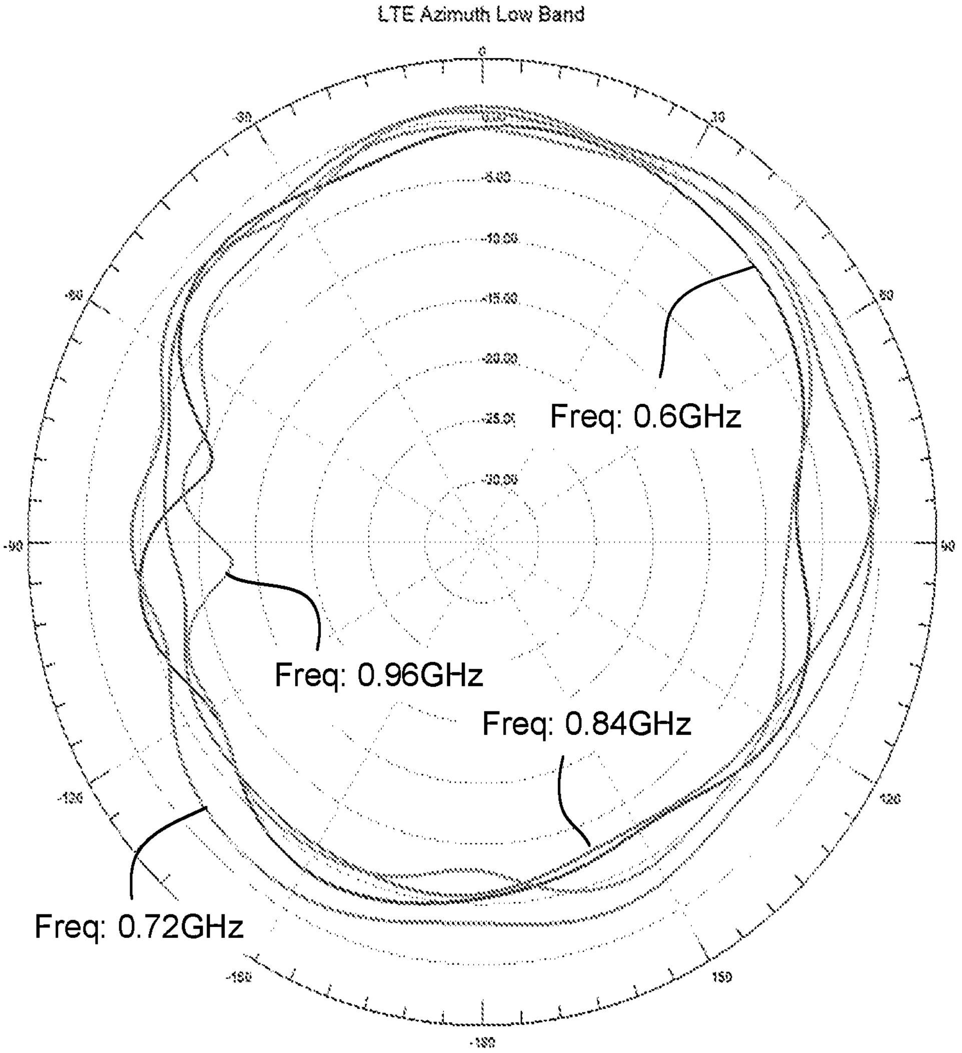
Figure 12:
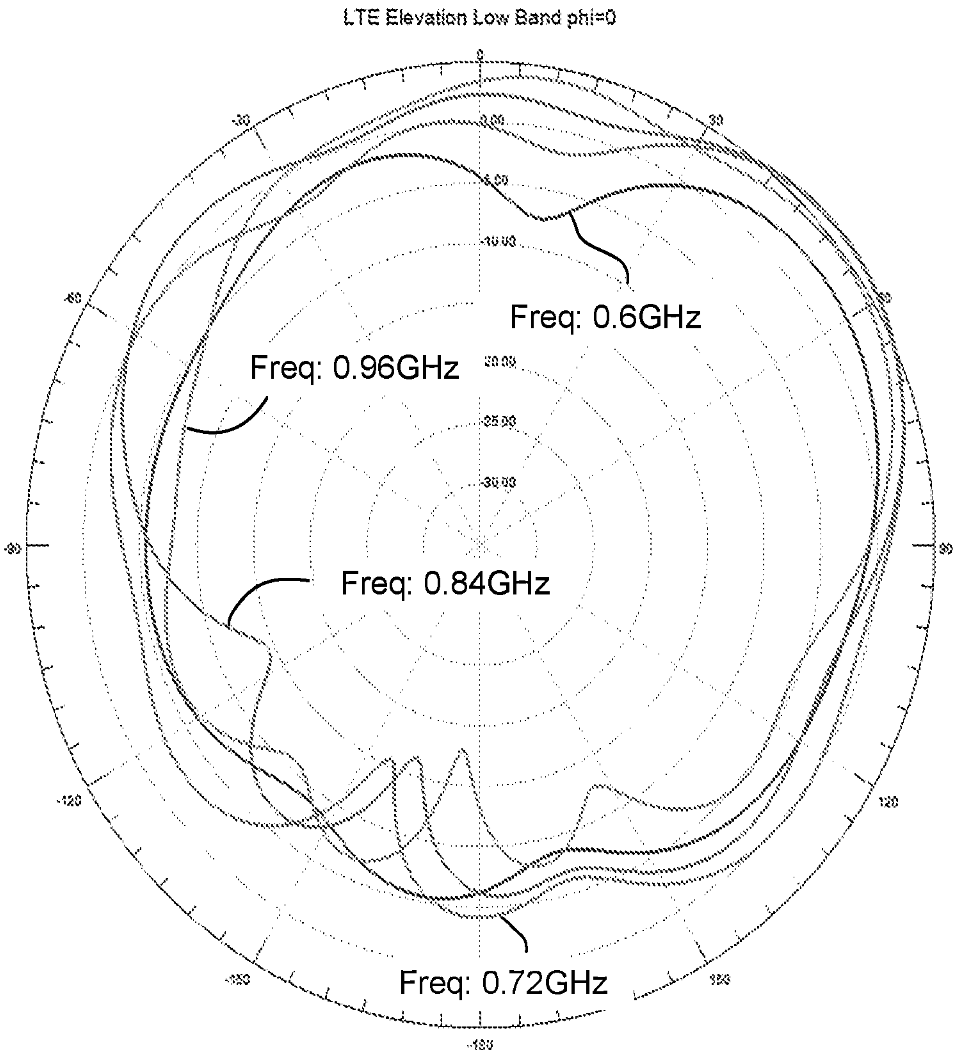
Figure 13:
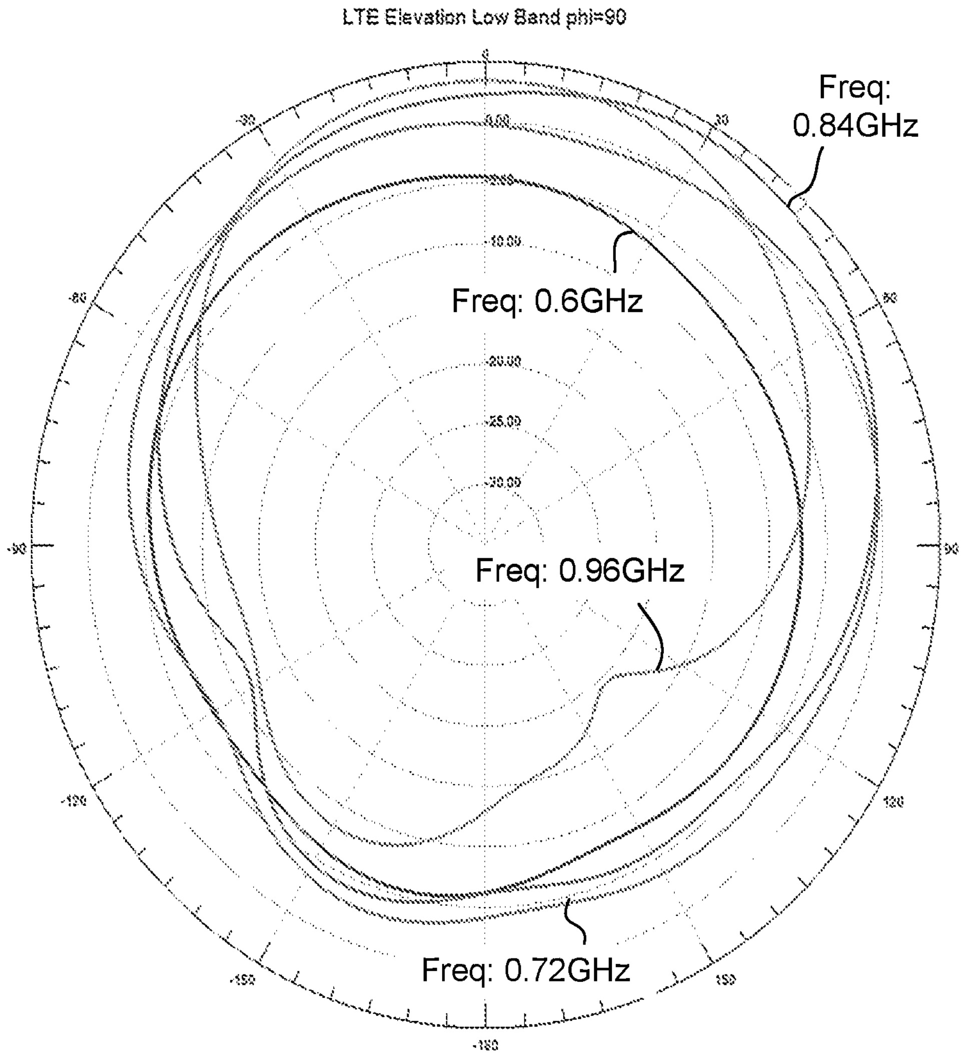
Figure 14:
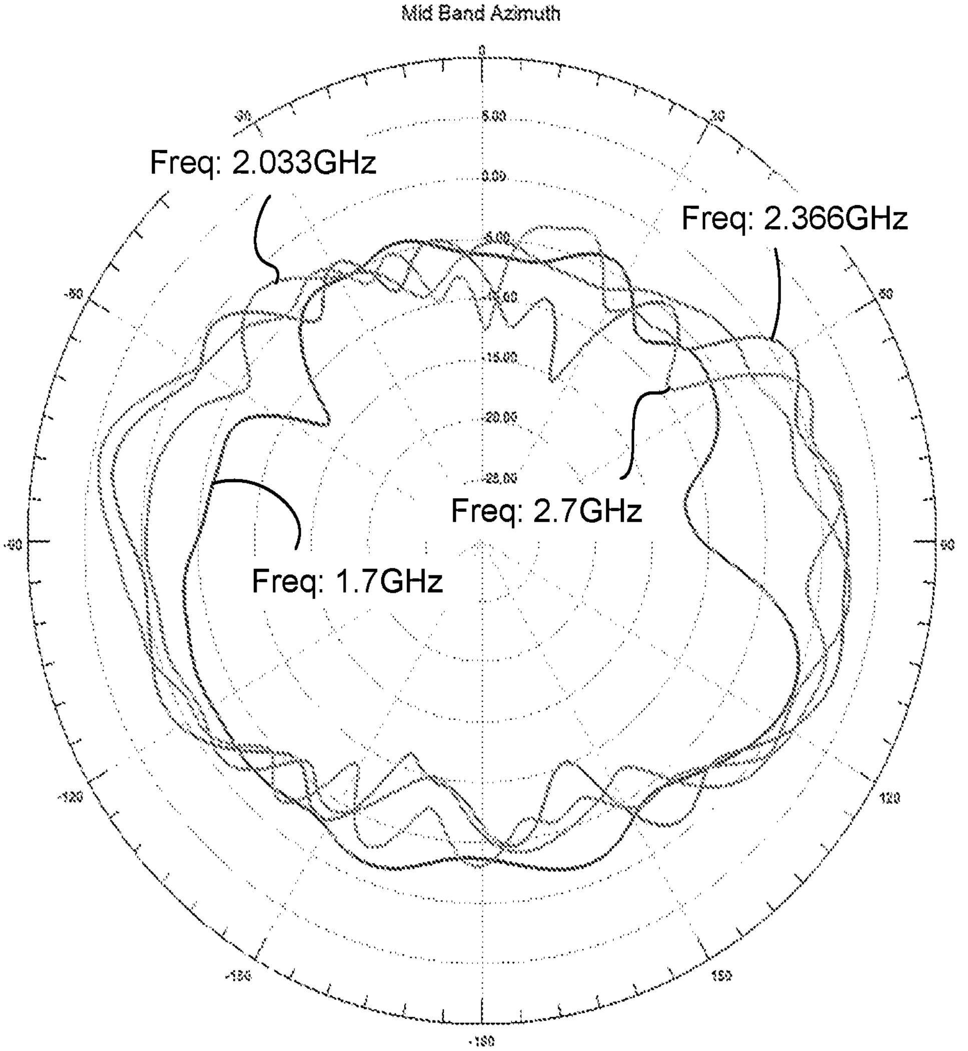
Figure 15:
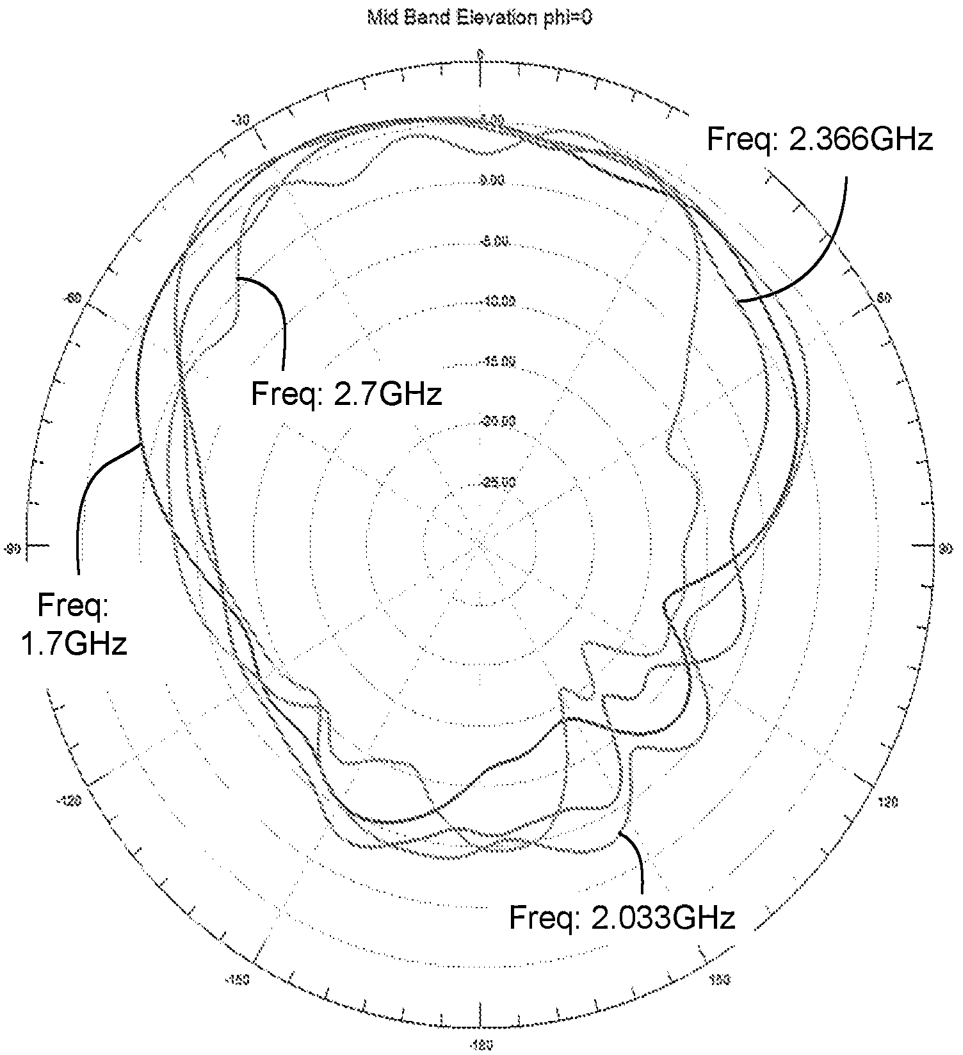
Figure 16:
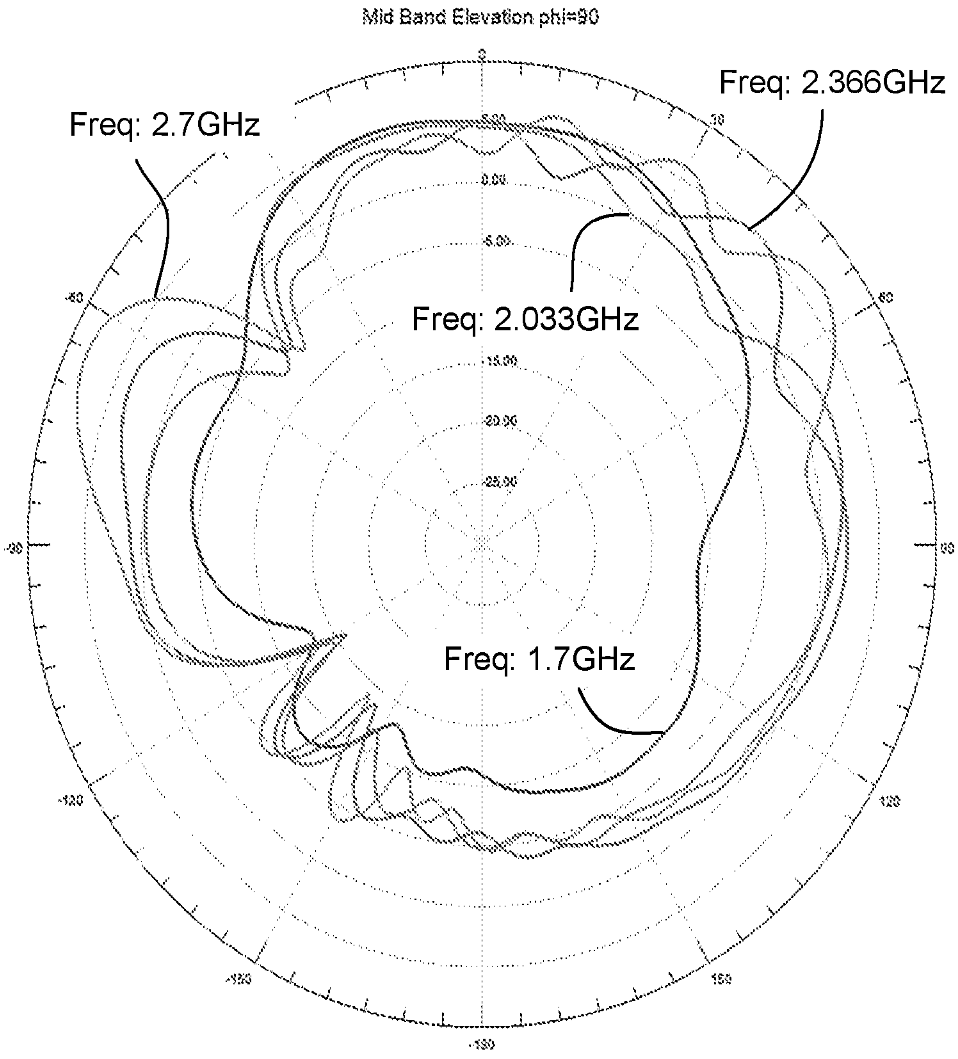
Figure 17:
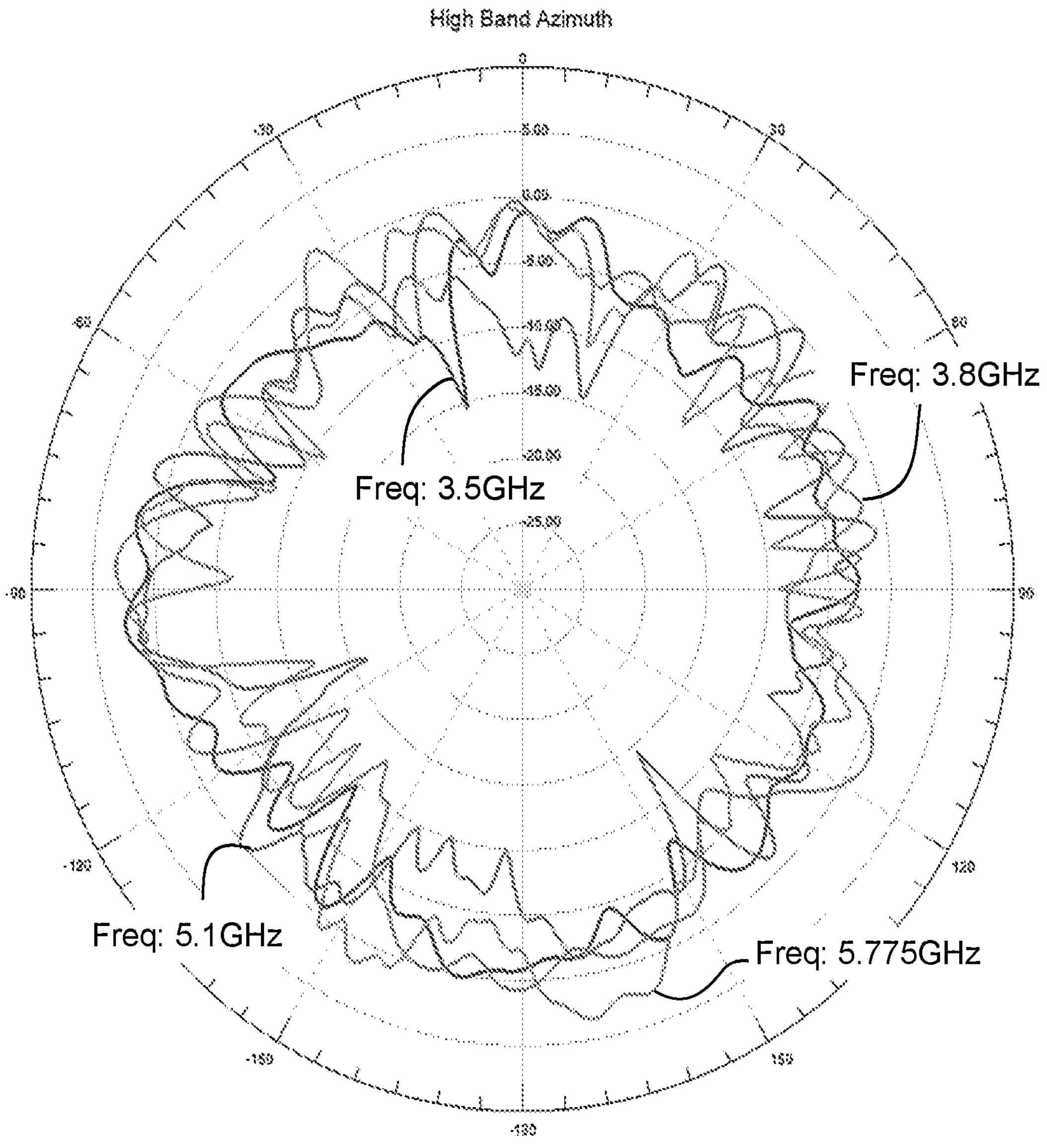
Figure 18:
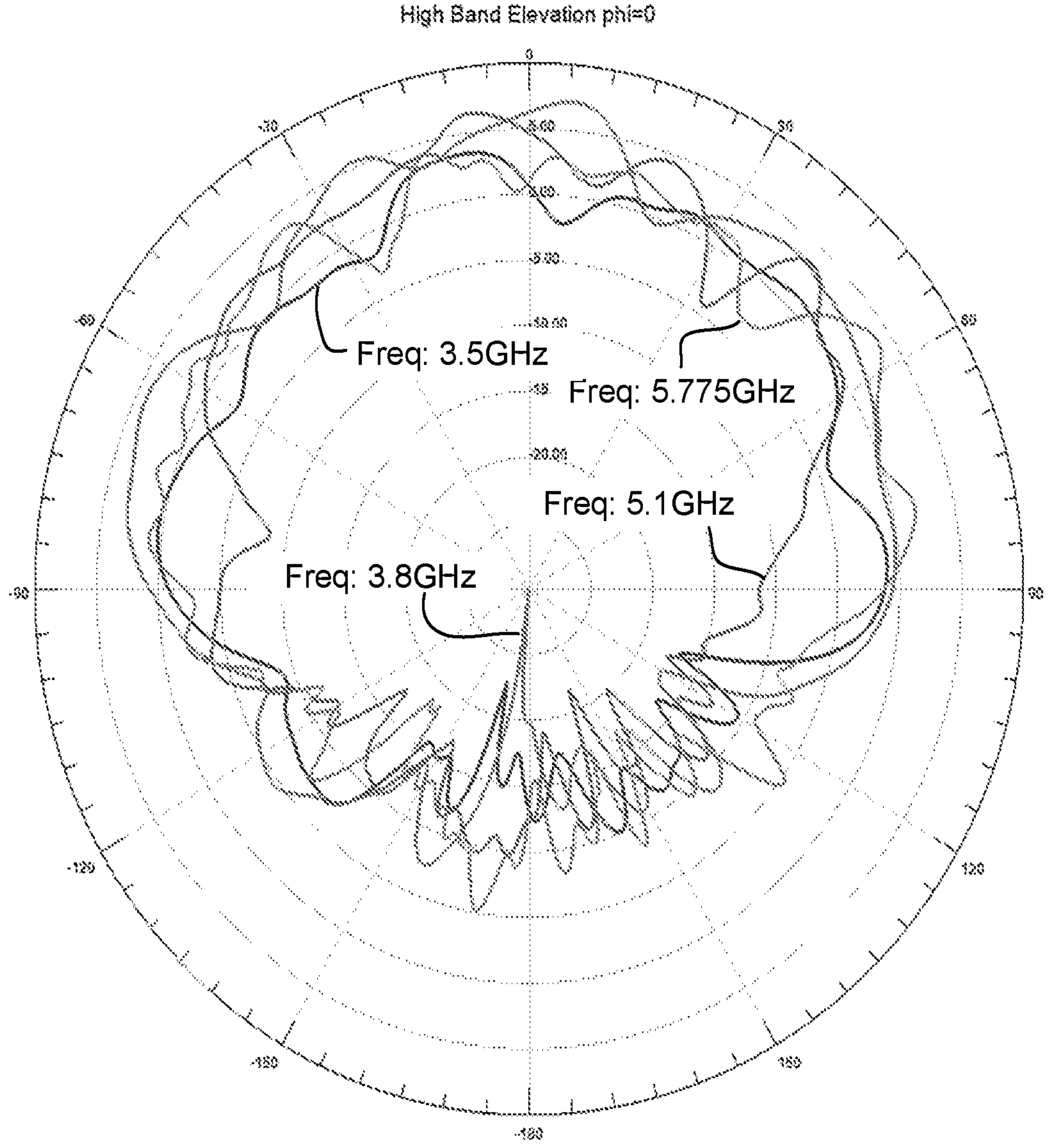
Figure 19:
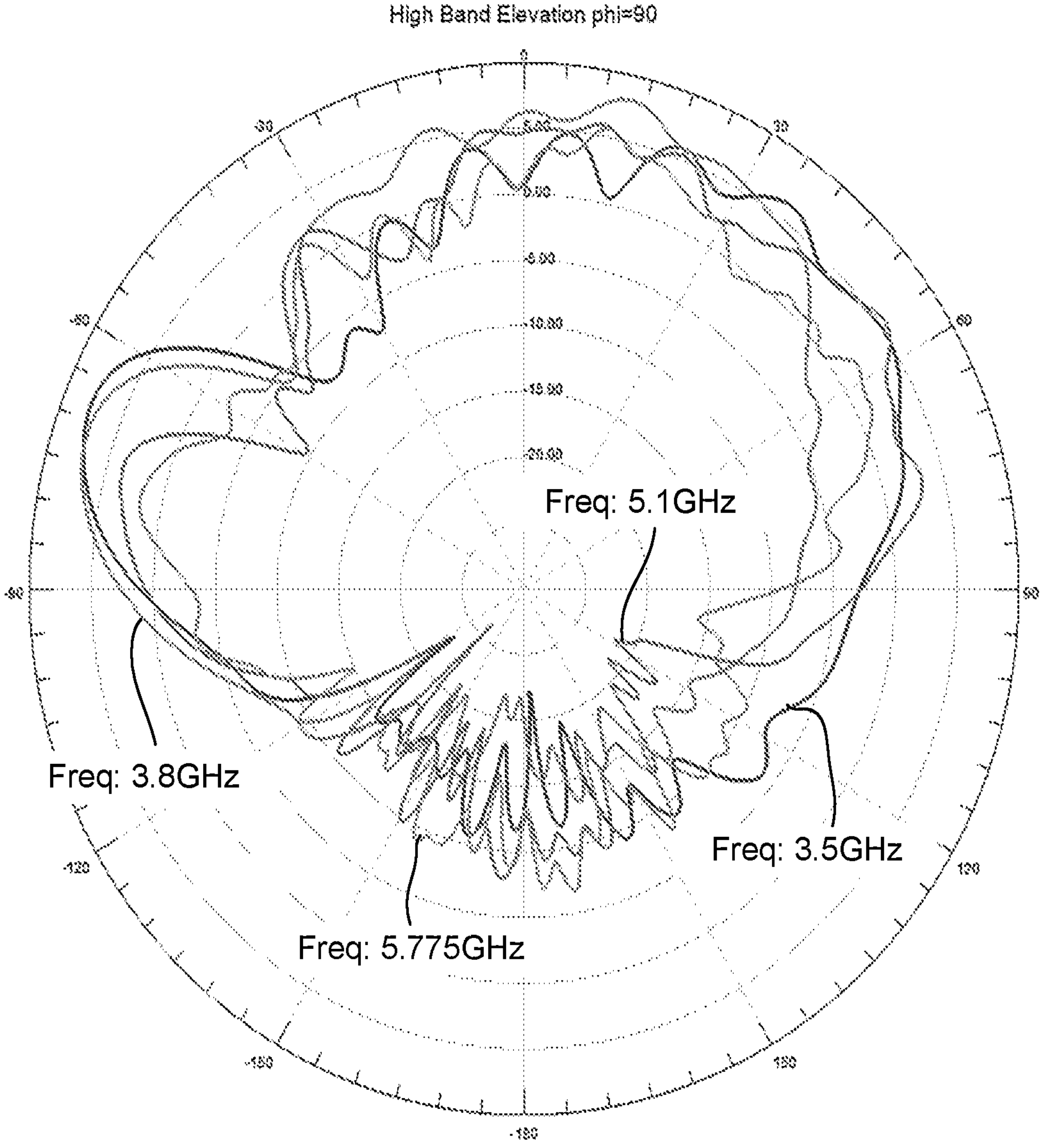

Referring now also to FIGS. 2-19 in the drawings, assorted graphs of various frequencies are shown for Ports 5 and 8 within LTE Elevation Low Band, Mid Band, and High Band ranges. In particular, FIGS. 2-4 illustrate Port 5 within the LTE. FIGS. 5-7 illustrate Port 5 in the Mid Band. FIGS. 8-10 illustrate Port 5 in the High Band. This is similarly organized for Port 8 in the Low Band (FIGS. 11-13), Mid Band (FIGS. 14-16), and High Band (FIGS. 17-19). These are representative only but act to illustrate a level of performance possible as a unit 101. It is understood that other performance data is possible for Ports 10, 21, or others.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An antenna unit, comprising:

a case including a base and a lid, the lid being configured to be coupled to the base to selectively permit access to an interior of the case;

an antenna assembly located within the lid;

one or more components located within the base;

wherein the case is IP67 compliant and the antenna assembly is configured to operate with the lid in a closed position relative to the base;

wherein the antenna assembly includes a plurality of antennas;

wherein the plurality of antennas are coupled to a baseplate; and wherein the baseplate acts as a reflector for the plurality of antennas when the lid is in the closed position relative to the base.

2. The unit of claim 1, wherein the case comprises a barrier located between the antenna assembly and the one or more components located within the base.

3. The unit of claim 1, wherein the plurality of antennas comprises at least one GPS antenna within the lid.

4. The unit of claim 1, wherein the plurality of antennas comprises at least a plurality of LTE antennas within the lid.

5. The unit of claim 1, wherein the plurality of antennas comprises at least a plurality of Wi-Fi antennas within the lid.

6. The unit of claim 1, wherein the plurality of antennas comprises at least one GPS antenna, at least eight LTE antennas, and at least four Wi-Fi antennas, each antenna being within the lid.

7. The unit of claim 1, wherein each of the plurality of antennas operates simultaneously during use.

8. The unit of claim 1, wherein the antenna assembly includes one or more printed circuit board antennas within the lid.

9. The unit of claim 1, wherein the antenna assembly is configured to at least extend from 600 MHz to 6 GHz bands.

10. The unit of claim 1, wherein the antenna assembly is configured to at least extend from 28 GHz to 36 GHz bands.

11. The unit of claim 1, wherein the antenna assembly is configured to at least extend from 24 GHz to 39 GHz bands.

12. The unit of claim 1, wherein the antenna assembly is configured to at least extend from 600 MHz to 39 GHz bands.

13. The unit of claim 1, wherein the one or more components located in the base comprise a plurality of batteries and a plurality of routers.

14. An antenna unit, comprising:

a case including a base and a lid, the lid being configured to be coupled to the base to selectively permit access to an interior of the case;

an antenna assembly located within the lid;

one or more components located within the base;

wherein the case is IP67 compliant and the antenna assembly is configured to operate with the lid in a closed position relative to the base;

wherein the antenna assembly includes a plurality of antennas;

wherein the plurality of antennas are coupled to a baseplate;

wherein the baseplate acts as a reflector for the plurality of antennas when the lid is in the closed position relative to the base; and wherein the plurality of antennas comprises at least one GPS antenna within the lid, at least a plurality of LTE antennas within the lid, at least a plurality of Wi-Fi antennas within the lid, wherein the antenna assembly is configured to at least extend from 600 MHz to 6 GHz bands.

* * * * *